(12) United States Patent
James

(10) Patent No.: US 10,127,926 B2
(45) Date of Patent: Nov. 13, 2018

(54) SECURELY EXECUTING VOICE ACTIONS WITH SPEAKER IDENTIFICATION AND AUTHENTICATION INPUT TYPES

(71) Applicant: GOOGLE LLC, Mountain View, CA (US)

(72) Inventor: Barnaby John James, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/178,895

(22) Filed: Jun. 10, 2016

(65) Prior Publication Data

US 2017/0358317 A1    Dec. 14, 2017

(51) Int. Cl.
| | |
|---|---|
| *G10L 17/22* | (2013.01) |
| *G06F 21/30* | (2013.01) |
| *G10L 25/48* | (2013.01) |
| *G10L 15/26* | (2006.01) |
| *G10L 15/30* | (2013.01) |
| *G10L 17/02* | (2013.01) |
| *H04W 12/06* | (2009.01) |

(Continued)

(52) U.S. Cl.
CPC .............. *G10L 25/48* (2013.01); *G06F 21/32* (2013.01); *G06F 21/35* (2013.01); *G10L 15/22* (2013.01); *G10L 15/26* (2013.01); *G10L 15/30* (2013.01); *G10L 17/00* (2013.01); *G10L 17/02* (2013.01); *H04L 63/0861* (2013.01); *H04W 12/06* (2013.01); *G07C 9/00158* (2013.01); *G10L 2015/223* (2013.01)

(58) Field of Classification Search
CPC ......... G10L 15/22; G10L 15/24; G10L 15/25; G10L 17/005; G10L 17/10; G10L 17/22; G10L 17/24; G10L 2015/223; H04L 63/08; H04L 63/0861; H04L 63/105; G06F 21/30

USPC .......... 704/246, 270, 273, 275; 726/2, 4, 18, 726/21, 27

See application file for complete search history.

(56) References Cited

U.S. PATENT DOCUMENTS

| | | | |
|---|---|---|---|
| 6,496,107 B1 | 12/2002 | Himmelstein | |
| 6,498,970 B2 * | 12/2002 | Colmenarez | ........ B60R 25/2045 |
| | | | 704/273 |

(Continued)

OTHER PUBLICATIONS

International Search Report and Written Opinion in International Application No. PCT/US2016/064014, dated Mar. 20, 2017, 14 pages.

(Continued)

*Primary Examiner* — Martin Lerner

(74) *Attorney, Agent, or Firm* — Fish & Richardson P.C.

(57) ABSTRACT

In some implementations, (i) audio data representing a voice command spoken by a speaker and (ii) a speaker identification result indicating that the voice command was spoken by the speaker are obtained. A voice action is selected based at least on a transcription of the audio data. A service provider corresponding to the selected voice action is selected from among a plurality of different service providers. One or more input data types that the selected service provider uses to perform authentication for the selected voice action are identified. A request to perform the selected voice action and (i) one or more values that correspond to the identified one or more input data types are provided to the service provider.

23 Claims, 5 Drawing Sheets

(51) Int. Cl.
*G06F 21/32* (2013.01)
*G06F 21/35* (2013.01)
*G10L 17/00* (2013.01)
*H04L 29/06* (2006.01)
*G10L 15/22* (2006.01)
*G07C 9/00* (2006.01)

(56) References Cited

U.S. PATENT DOCUMENTS

| | | | | |
|---|---|---|---|---|
| 6,757,718 | B1* | 6/2004 | Halverson | G06F 9/465 704/257 |
| 7,043,235 | B2* | 5/2006 | Meyer | G06F 17/30014 379/201.01 |
| 7,698,566 | B1* | 4/2010 | Stone | H04L 63/08 713/186 |
| 8,032,383 | B1* | 10/2011 | Bhardwaj | G10L 15/30 704/275 |
| 8,244,543 | B2* | 8/2012 | Alfred | G10L 15/26 704/275 |
| 8,363,086 | B1* | 1/2013 | Shah | H04W 4/008 348/14.02 |
| 8,543,834 | B1 | 9/2013 | Barra | |
| 9,558,749 | B1* | 1/2017 | Secker-Walker | G10L 17/02 |
| 2004/0010698 | A1* | 1/2004 | Rolfe | H04L 63/0823 713/186 |
| 2005/0030151 | A1* | 2/2005 | Singh | B60R 25/1004 340/5.8 |
| 2007/0143825 | A1* | 6/2007 | Goffin | H04L 63/08 726/2 |
| 2013/0227678 | A1* | 8/2013 | Kang | G10L 17/10 726/19 |
| 2014/0122087 | A1* | 5/2014 | Macho | G10L 17/22 704/275 |
| 2014/0163976 | A1* | 6/2014 | Park | G10L 15/00 704/231 |
| 2014/0330560 | A1 | 11/2014 | Venkatesha et al. | |
| 2014/0342667 | A1* | 11/2014 | Aarnio | H04W 4/008 455/41.2 |
| 2014/0372128 | A1* | 12/2014 | Sheets | G06Q 20/40145 704/273 |
| 2015/0081295 | A1 | 3/2015 | Yun et al. | |
| 2015/0106167 | A1* | 4/2015 | Russell | G10L 15/26 705/7.42 |
| 2015/0241962 | A1 | 8/2015 | Reznik et al. | |
| 2015/0302188 | A1* | 10/2015 | Potbhare | G06F 21/57 713/185 |
| 2015/0302856 | A1 | 10/2015 | Kim et al. | |
| 2016/0021105 | A1 | 1/2016 | Pellom et al. | |
| 2016/0282934 | A1* | 9/2016 | Willis | G06F 3/017 |
| 2016/0359838 | A1* | 12/2016 | Dasgupta | G06F 21/32 |
| 2017/0040018 | A1* | 2/2017 | Tormey | G10L 15/22 |
| 2017/0048707 | A1* | 2/2017 | Ortiz | H04L 63/0861 |
| 2017/0085565 | A1* | 3/2017 | Sheller | H04L 63/0876 |
| 2017/0256256 | A1* | 9/2017 | Wang | G10L 15/22 |
| 2017/0330277 | A1* | 11/2017 | Wishne | H04L 63/08 |
| 2018/0053507 | A1* | 2/2018 | Wang | G10L 15/22 |

OTHER PUBLICATIONS

Written Opinion issued in International Application No. PCT/US2016064014, dated May 9, 2018, 7 pages.
International Preliminary Report on Patentability issued in International Application No. PCT/US2016/064014, dated Sep. 21, 2018, 8 pages.

* cited by examiner

SECURELY EXECUTING VOICE ACTIONS WITH SPEAKER IDENTIFICATION AND AUTHENTICATION INPUT TYPES

FIELD

This specification describes technologies related to voice actions.

BACKGROUND

Voice activated devices may perform voice actions in response to speech. For example, a person may say "Computer, call 1-888-888-8888" and their mobile computing device may, without further input from the person, call the number 1-888-888-8888.

SUMMARY

Voice actions generally are intended to enable users to conveniently cause actions to be performed. For example, a user may simply say "Computer, set a timer for one minute" while they are cooking instead of physically interacting with a device to create a timer for one minute. However, some voice commands request voice actions that may have serious effects. For example, executing a voice action may disarm a home security system, order items at a large monetary cost, or greatly change a home temperature setting. Additionally, devices that perform voice actions may be accessible to multiple people. For example, a device that performs voice actions may be on a kitchen counter and may receive speech from any person speaking near the device. Accordingly, applying security restrictions when executing voice actions may be important. For example, it may be desirable for a system to disarm a security system in response to a homeowner saying "Computer, disarm security system" and not disarm the security system in response to a guest or an intruder saying "Computer, disarm security system."

While a system could request explicit authentication information from speakers when executing a voice action, requiring explicit authentication information may reduce the convenience provided by using voice actions. For example, requesting an authorization pin code from a speaker before accepting voice actions may inconvenience speakers enough so that they stop using voice commands. Accordingly, to securely perform voice actions in a convenient manner, a system may identify a speaker from their voice and use additional contextual signals to authenticate the speaker. Contextual signals may include, for example, an indication that a user's mobile computing device is home, an indication that the user's mobile computing device has been on a person's body since it was last unlocked, or some other signal. For example, the system may receive an utterance of "Computer, disarm security system," identify the speaker's voice as that of the homeowner, and in response, further determine that the home owner's mobile computing device is in the home. The command to disarm the security system can be performed based on the successful voice identification and the physical presence of the computing device. By contrast, the system can be configured so that if required contextual factors are not present, e.g., if voice identification failed or if the homeowner's computing device were not present, then the command would be disallowed for failing to meet security requirements. As a result, the system may enable convenient and secure execution of voice actions.

In a general aspect, a method includes obtaining (i) audio data representing a voice command spoken by a speaker and (ii) a speaker identification result indicating that the voice command was spoken by the speaker, selecting a voice action based at least on a transcription of the audio data, selecting a service provider corresponding to the selected voice action from among a plurality of different service providers, identifying one or more input data types that the selected service provider uses to perform authentication for the selected voice action, and providing, to the service provider, (i) a request to perform the selected voice action and (i) one or more values that correspond to the identified one or more input data types.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For instance, in certain aspects obtaining (i) audio data representing a voice command spoken by a speaker and (ii) a speaker identification result indicating that the voice command was spoken by the speaker may include obtaining the audio data representing the voice command spoken by the speaker, obtaining a voiceprint for the speaker, determining that the voiceprint for the speaker matches the audio data representing the voice command spoken by the speaker, and in response to determining that the voiceprint for the speaker matches the audio data representing the voice command spoken by the speaker, generating the speaker identification result indicating that the voice command was spoken by the speaker.

In some aspects, selecting a voice action based at least on a transcription of the audio data includes obtaining a set of voice actions, where each voice action identifies one or more terms that correspond to that voice action, determining that one or more terms in the transcription match the one or more terms that correspond to the voice action, and in response to determining that the one or more terms in the transcription match the one or more terms that correspond to the voice action, selecting the voice action from among the set of voice actions.

In some implementations, selecting a service provider corresponding to the selected voice action from among a plurality of different service providers includes obtaining a mapping of voice actions to the plurality of service providers, where for each voice action the mapping describes a service provider that can perform the voice action, determining that the mapping of voice actions indicates that the service provider can perform the selected voice action, and in response to determining that the mapping of voice actions indicates that the service provider can perform the selected voice action, selecting the service provider.

In certain aspects, identifying one or more input data types that the selected service provider uses to perform authentication for the selected voice action includes providing, to the selected service provider, a request for an identification of one or more input data types that the selected service provider uses to perform authentication for the selected voice action, receiving, from the selected service provider, a response to the request for the identification, and identifying the one or more input data types that the selected service provider uses to perform authentication for the selected voice action from the response to the request for the identification.

In some aspects, actions include generating the transcription of the audio data using an automated speech recognizer. In some implementations, actions include receiving, from the service provider, an indication that the selected voice action has been performed. In certain aspects, actions include receiving, from the service provider, an indication that additional authentication is needed to perform the selected voice action and in response to receiving, from the service provider, the indication that additional authentication is needed to perform the selected voice action, providing a request for additional authentication. In some aspects, identifying one or more input data types that the selected service provider uses to perform authentication for the selected voice action includes identifying that the selected service provider uses one or more of an input data type that indicates whether the speaker's mobile computing device has been on a body since the mobile computing device was last unlocked, an input data type that indicates whether a speaker's mobile computing device is in short-range communication with a particular device, an input data type that indicates whether a speaker's mobile computing device is within a particular geographic area, or an input data type that indicates whether a speaker's face is in a view of a device.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
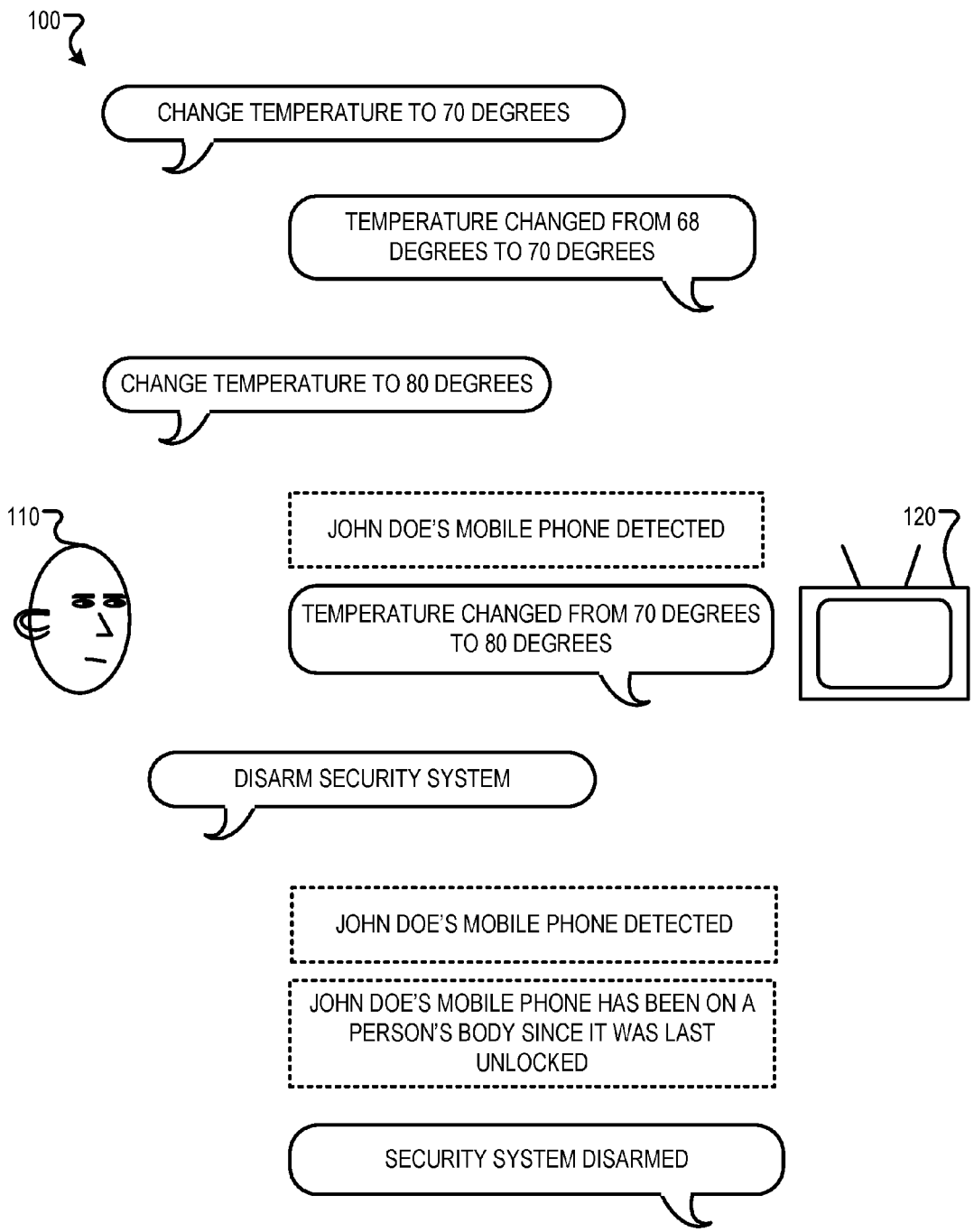
FIG. 1 is a block diagram that illustrates an example interaction with a system for securely executing voice actions.

FIG. 1 is a block diagram that illustrates an example interaction 100 with a system for securely executing voice actions. The interaction 100 is between a user 110 and the system 120. In the example, the system 120 includes a television that includes a microphone that can listen to speech from the user 110 and a speaker that can output synthesized speech to the user 110. In other examples, the system 120 may include an additional or alternate device that can perform voice actions. As shown in the example, the system 120 enforces different levels of security requirements for voice commands depending on the nature of the voice command and context of the voice command, and also uses voice identification as part of a determination whether to perform a voice action.

As illustrated, the user 110 initially says "Change temperature to 70 degrees." The system 120 receives the utterance from the user 110, determines that the current temperature is 70 degrees and, in response, determines that changing the temperature to 70 degrees is a small change that doesn't require any authentication. The system 120 then changes the temperature setting of the home to 70 degrees and outputs synthesized speech of "Temperature changed from 68 degrees to 70 degrees."

Continuing the example, the user 110 later says "Change temperature to 80 degrees." The system 120 receives the utterance from the user 110, determines that the current temperature is 70 degrees and, in response, determines that changing the temperature to 80 degrees is a large change that requires a low level of authentication. The system 120 then identifies the speaker as "John Doe" by matching a stored voiceprint for "John Doe" with the utterance, and determines that a mobile computing device registered with "John Doe" is at home. Because the system 120 determines that the voice identification and/or presence of the mobile computing device satisfy the "low" level of authentication requirements, the system 120 changes the temperature setting of the home to 80 degrees and outputs synthesized speech of "Temperature changed from 70 degrees to 80 degrees." A stored voiceprint may indicate a sound of a user's voice including one or more of pitch, speed, tone, pronunciation, accent, modulation, or other aspects.

The user 110 later says "Disarm security system." The system 120 receives the utterance from the user 110, determines that disarming the security system requires a high level of authentication, which has greater security requirements than the other commands shown in FIG. 1. To determine whether to carry out the command, the system 120 identifies the speaker as "John Doe" from matching a stored voiceprint from "John Doe" with the utterance, determines that a mobile computing device registered with "John Doe" is at home, and determines that a mobile computing device registered with "John Doe" has been on a person's body since it was last unlocked. The system 120 determines that together these factors satisfy the "high" level of authentication, and, in response, disarms the security system and outputs synthesized speech of "security system disarmed."

Figure 2:
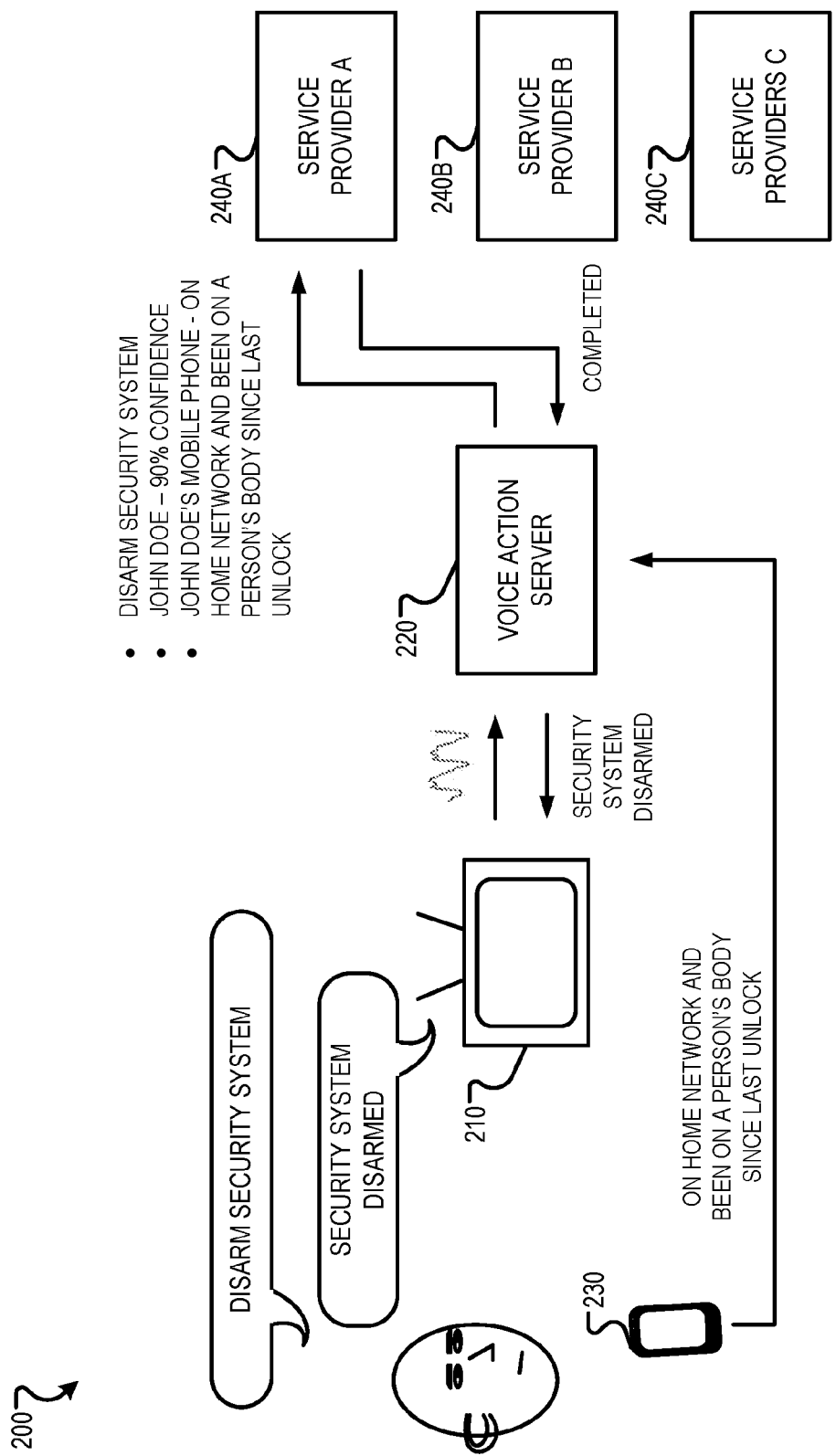
FIG. 2 is a block diagram of an example system for securely executing voice actions.

FIG. 2 is a block diagram of an example system 200 for securely executing voice actions. In some implementations, the system 200 may be the system 120 shown in FIG. 1. The system 200 for securely executing voice actions may include a local device 210, a voice action server 220, a mobile computing device 230, and service providers 240A, 240B, 240C (collectively 240).

The local device 210 may be a device that includes a microphone that is within an audible hearing range of a user speaking a voice command. For example, the local device 210 may be a voice-action-enabled television, a countertop home voice automation device, or a home security system with voice automation functionality. A voice command may refer to speech that triggers the system 200 to attempt to perform a voice action. For example, voice commands that request the voice action of disarming a security system may include "Disarm security system," "Turn off security system," or "Security system to disarmed state." A voice action may refer to an action that is triggered by speech. For example, a voice action of disarming a security system may refer to an action of disarming a security system that is triggered by speech.

The local device 210 may receive an utterance from a user and provide audio data representing the utterance to the voice action server 220. Audio data may include Mel Frequency Cepstral Coefficients (MFCC) that represent the utterance. For example, the local device 210 may use a microphone to detect sounds including the user speaking "Disarm security system," and in response, provide audio data representing that utterance to the voice action server 220. The local device 210 may additionally or alternatively receive information from the voice action server 220 to provide to a user. For example, the local device 210 may receive audio data for synthesized speech of "Security system disarmed" and then output the synthesized speech through a speaker to the user.

The voice action server 220 may receive, from the local device 210, audio data representing an utterance and determine whether to perform a voice action corresponding to the utterance. For example, the voice action server 220 may receive audio data representing the utterance "disarm security system" and determine to perform a voice action for disarming a home security system. The voice action server 220 also facilitates communication with the service providers 240 and in gathering contextual information that allow the service providers 240 to determine whether the security requirements for voice actions have been met. For example, the voice action server 220 can receive contextual information from the local device 210 and pass the information to the service providers 240. When additional information is needed from the user, or when errors occur, information can be transmitted between the user and the service providers 240 through the voice action server 220.

In determining to perform a voice action, the voice action server 220 may select a service provider to perform the voice action. Each of the service providers 240 may be associated with particular actions or types of actions that they handle, and the voice action server 220 may route each request to the appropriate service provider 240. For example, in determining to perform a voice action of disarming a home security system, the voice action server 220 may select service provider A 240A that may be associated with a home security system. In another example, in response to determining to perform a voice action of making a reservation at a restaurant, the voice action server 220 may select service provider B 240B that may be associated with a restaurant reservation management application or website.

The voice action server 220 may identify input data types that the selected service provider uses to perform authentication and values for those data types. Different service providers 240 may use different types of input data to determine whether appropriate authentication or security requirements have been met. Similarly, different voice actions supported by a single service provider may require different types of input data. The voice action server 220 may format each voice action request to include the data needed to assess the security requirements for the particular voice action being requested, and for the particular service provider to which the voice action request is sent. For example, the voice action server 220 may determine that the service provider A 240A uses a data type of voice match confidence, a data type corresponding to geographical location of a user's mobile computing device, and a data type corresponding to a status of a user's mobile computing device being on a person's body since last unlock. Then, the voice action server 220 determines values for these data types, e.g., data indicating that there's a 90% voice match confidence, that the user's mobile computing device is within a particular geographic area, and that the user's mobile computing device was on a person's body since it was last unlocked. In another example, the voice action server 220 may determine that the service provider B 240B uses a voice match confidence and a status about a mobile computing device being on a person's body since last unlock, and then determine values indicating that there's a 80% voice match confidence and the user's mobile computing device was on a person's body since it was last unlocked.

The input data types may represent contextual signals that can be used to authenticate the user without requesting the user provide explicit authentication information. Input data types may include one or more of an input data type that indicates whether the speaker's mobile computing device has been on a body since the mobile computing device was last unlocked, an input data type that indicates whether a speaker's mobile computing device is in short-range communication with a particular device, an input data type that indicates whether a speaker's mobile computing device is within a particular geographic area, or an input data type that indicates whether a speaker's face is in a view of a device.

For example, a value for a voice match confidence may be determined based on using the audio data representing a voice command without requesting the user provide additional speech for authentication purposes. In another example, a value for user's mobile computing device being in physical proximity may be determined based on determining whether a mobile computing device, of a user identified from the audio data representing a voice command, is within a geographical area without having the user provide additional information. In yet another example, the voice action server 220 may receive an image of a speaker from a networked camera with a view of the local device 210 and for an input data type indicating whether a speaker's face is verified by the networked camera determine a value that indicates whether the speaker's face is verified.

The voice action server 220 may determine the values for the identified input data types based on the mobile computing device 230 of the user. For example, the voice action server 220 may determine that a user's mobile computing device 230 is at home, e.g., that a location of the device 230 coincides with a location the user designated as the user's home, or the computing device 230 is in short-range communication with the device 210 known to be located in the user's home. The voice action server 220 may then determine a value indicating that the user's mobile computing device 230 is at home, and provide the value to a service provider when the service provider is configured to receive data of that type.

In some implementations, the voice action server 220 may determine an identity of the user from the audio data, identify the mobile computing device 230 of the user, determine a status of the mobile computing device, and then determine the values for the identified input data types from the status of the mobile computing device. For example, the voice action server 220 may determine that a voice command is from "John Doe" based on the voice in the voice command matching a stored voice print for "John Doe," determine a device identifier stored for the mobile computing device 230 used by "John Doe," request information from the device 230 corresponding to the device identifier, receive the requested information from the device 230, and generate values using the information from the device 230. In another example, the voice action server 220 may determine that a voice command is from "John Doe" based on the voice in the voice command matching a stored voice print for "John Doe," determine a device identifier stored for the mobile computing device 230 used by "John Doe," identify information already stored by the voice action server 220 corresponding to the device identifier, and generate values using the identified already stored information.

The information from the device 230 may include one or more of, a location of the device 230 based on a GPS sensor in the device 230, other devices with which the device 230 is in short range wireless communication, whether the device 230 has been on a person's body since the device 230 was last unlocked, an image of a current view of the device 230, or some other information.

In another example, the voice action server 220 may determine that a voice command is from "John Doe" based on the voice in the voice command matching a stored voice print for "John Doe," determine a device identifier stored for the mobile computing device 230 used by "John Doe," request information from other devices about the device 230 corresponding to the device identifier, receive the requested information from the other devices, and generate values using the information from the other devices. The information from the device 230 may include one or more of, an indication that the other device is in short range wireless communication with the device 230 or the device 230 was detected within a geographic area by the other device.

In some implementations, the voice action server 220 additionally or alternatively receives information from the local device 210 that can be used to generate values for input data types. The local device 210 may provide the information with the audio data representing the utterance of a voice command or provide the information in response to the voice action server 220 requesting information from the local device 210.

The voice action server 220 may provide the selected service provider a request to perform a voice action and values for the identified input data types that the selected service provider uses to perform authentication. For example, the voice action server 220 may provide service provider A 240A a request to disarm a security system and values indicating (i) that there's a 80% voice match confidence that the user is "John Doe" and (ii) that the mobile computing device of "John Doe" is within a particular geographic area and was on a person's body since it was last unlocked.

The voice action server 220 may provide the selected service provider values for the identified input data types, as the service providers may have additional information or rules for use in determining an appropriate level of authentication that the voice action server 220 may not have. For example, the level of authentication for changing a home temperature may be dependent on the amount of change, e.g., small changes may need no or little authentication but large changes that may result in substantial costs may require increasingly high authentication, and voice action server 220 may not know a current temperature setting of a home that the service provider knows. Accordingly, the arrangement may enable flexibility for service providers to determine rules for authentication and may enable security by limiting the information provided to the voice action server 220.

In response to providing the request and values to the selected service provider, the voice action server 220 may receive an indication that the selected voice action was performed. For example, the voice action server 220 may receive an indication of completed from service provider A 430A. In response to the indication that the selected voice action was performed, the voice action server 220 may provide an indication to the local device 210 that the voice action was performed.

Additionally or alternatively, in response to providing the request and values to the selected service provider, the voice action server 220 may receive an indication that additional authentication is needed to perform the selected voice action. For example, the voice action server 220 may receive, from the service provider A 430A, an indication of additional authentication needed by the service provider A 430A.

In response to the indication that additional authentication is needed, the voice action server 220 may provide an indication to the local device 210 that the voice action was not performed because additional authentication was needed. In some implementations, the indication from the selected server provider may indicate an input data type for the additional authentication needed and the voice action server 220 may provide a request to the local device 210 for the user to provide information for the input data type needed for the additional authentication. In some implementations, the additional authentication may include request that may be an explicit authorization code, a password, additional voice verification phrases, or that the user agree to using additional types of contextual information for authorization in the future.

In some implementations, the voice action server 220 may additionally or alternatively perform some authentication. For example, the voice action server 220 may obtain minimum authentication requirements for particular service providers or particular voice actions performed by particular service providers, and may make an initial determination whether those minimum authentication requirements are satisfied. In the example, if the minimum requirements are not satisfied, the voice action server 220 may not send the request to the selected service provider but instead indicate to the user that additional authentication information is necessary.

The service providers 240 may include on or more of a device, e.g., a thermostat or a home security system, an application, e.g., a calendar application or a voice dialing application, or a website, e.g., an online banking or online shopping website, or other entity, registered to perform certain actions or types of actions. As discussed above, the service providers 240 may have information that is unavailable to the voice action server 220 and may make an assessment of whether a voice action can be performed based on the information from the server used for authentication and from the information that is unavailable to the voice action server 220 but available to the service providers 240.

In some implementations, a voiceprint for the speaker may not be available and the system 200 may use input data types other than those based on voice verification for authentication. For example, the system 200 may use facial recognition only instead of facial recognition and voice verification.

In some implementations, the mobile computing device 230 may perform voice verification. For example, the mobile computing device 230 and the local device 210 both detect the same utterance. In the example, the mobile computing device 230 identifies the speaker and determines a voice match confidence, and then provides the identification and voice match confidence for the voice action server 220. The voice action server 220 then uses the identification and voice match confidence from the mobile computing device 230 instead of identifying the speaker and determining a voice match confidence. In another example, the mobile computing device 230 identifies the speaker and determines a voice match confidence, and then provides the identification and voice match confidence for the local device 210 to provide to the voice action server 220 along with the audio data representing the voice command. In yet another example, the local device 210 provides the audio data representing the voice command to the mobile computing device 230 to identify the speaker and determine a voice match confidence, and the mobile computing device 230 then provides the identification of the speaker and the voice match confidence to either the local device 210 to provide the voice action server 220 or directly to the voice action server 220.

Different configurations of the system 200 may be used where functionality of the local device 210, the voice action server 220, the mobile computing device 230, and the service providers 240A, 240B, 240C (collectively 240) may be combined, further separated, distributed, or interchanged. The system 200 may be implemented in a single device or distributed across multiple devices.

Speaker verification can be performed by any of various devices in the system 200. For example, the local device 210 may identify a speaker of a command, the voice action server 220 may identify the speaker of the command, or both may independently or cooperatively perform speaker identification. The identity of a speaker may be determined using the speech of the command itself, using a hotword or attention word that is spoken immediately before the command, or using other speech before or after the command.

Figure 3:
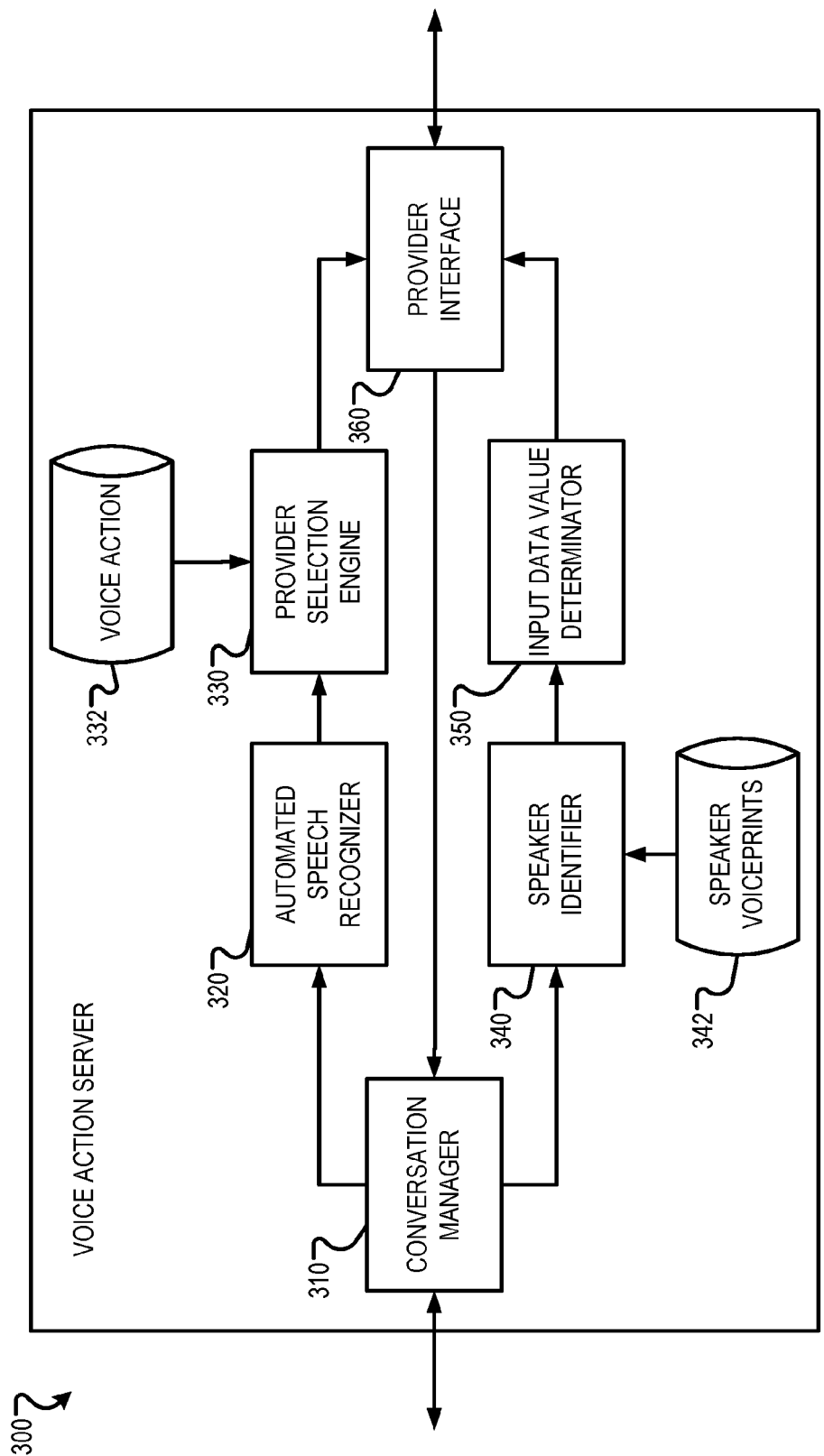
FIG. 3 is a block diagram of an example voice action server for securely executing voice actions.

FIG. 3 is a block diagram of an example voice action server 300 for securely executing voice actions. In some implementations, the server 300 may be the voice action server 220 shown in FIG. 2. In other implementations, the server 300 may be another voice action server.

The voice action server 300 may include a conversation manager 310, an automated speech recognizer 320, a provider selection engine 330, a voice action database 332, a speaker identifier 340, a speaker voiceprint database 342, an input data value determinator 350, and a provider interface 360.

The conversation manager 310 may manage a conversation with a user. For example, the conversation manager 310 may receive audio data representing speech of users and provide synthesized speech in response to the speech from users. The conversation manager 310 may receive audio data from a local device and provide the audio data to the automated speech recognizer 320 and the speaker identifier 340. For example, the conversation manager 310 may receive audio data representing "Change temperature to 80 degrees" and provide the audio data to the automated speech recognizer 320 and the speaker identifier 340. The conversation manager 310 may receive indications from the provider interface 360 whether a voice command was performed and then provide an indication to a local device. For example, the conversation manager 310 may receive an indication that a voice command for changing a temperature was performed to change the temperature from 70 degrees to 80 degrees and, in response, generate synthesized speech of "Temperature changed from 70 degrees to 80 degrees."

The automated speech recognizer 320 may receive audio data representing a voice command and generate a transcription of the audio data. For example, the automated speech recognizer 320 may receive audio data representing the voice command "Change temperature to 80 degrees" and, in response, generate a transcription of "Change temperature to 80 degrees." The automated speech recognizer 320 may provide the generated transcription to the provider selection engine 330. For example, the automated speech recognizer 320 may provide the transcription "Change temperature to 80 degrees" to the provider selection engine 330.

The provider selection engine 330 may receive a transcription and select a voice action based on the transcription. For example, the provider selection engine 330 may receive the transcription "Change temperature to 80 degrees" and, in response, select a voice action of "Change temperature" based on the transcription.

In selecting the voice action, the provider selection engine 330 may access data that indicates a set of voice actions from a voice action database 332, where each voice action identifies one or more terms that correspond to that voice action. For example, the voice action database 332 may indicate a set of voice actions including a voice action of "Change temperature" that is associated with the terms "Change temperature," "Temperature change," "Set temperature," or other terms. Another voice action indicated could be the action of "Disarm security system" that is associated with the terms "Disarm security system," "Unarm security system," "Set security system to disarmed," or other terms. The provider selection engine 330 may determine that one or more terms in the transcription match one or more terms that correspond to a voice action. For example, the provider selection engine 330 may determine that the transcription "Change temperature to 80 degrees" includes the terms "Change temperature." In response to determining that the one or more terms in the transcription match the one or more terms that correspond to the voice action, the provider selection engine 330 may select a voice action from among the set of voice actions. For example, in response to determining that the transcription "Change temperature to 80 degrees" includes the terms "Change temperature," the provider selection engine 330 may select the voice action "Change temperature."

The provider selection engine 330 may provide an indication of the selected voice action to the provider interface 360. For example, the provider selection engine 330 may provide the provide interface 360 an indication that the voice action of "Change temperature" was selected.

The speaker identifier 340 may obtain the audio data representing a voice command spoken by a speaker and generate a speaker identification result that indicates that the voice command was spoken by the speaker. For example, the speaker identifier 340 may obtain the audio data representing the voice command "Change temperature to 80 degrees" spoken by "John Doe" and generate a speaker identification results that indicates that the voice command was spoken by "John Doe."

The speaker identifier 340 may generate the speaker identification result by matching the audio data representing a voice command, or a hotword preceding the voice command, with a voiceprint for a user. For example, the speaker identifier 340 may generate the speaker identification result that indicates that "John Doe" spoke the voice command based on determining that the audio data for the voice command matches a stored voiceprint for "John Doe." The speaker identifier 340 may obtain the voiceprint for the user among a set of voiceprints stored in the speaker voiceprint database 342.

In some implementations, the speaker identifier 340 may determine a match confidence that represents a degree of match between the voiceprint for a user and the audio data that represents the voice command and include the match confidence in the speaker identification result. For example, the speaker identifier 340 may determine a match confidence of 80% and include an indication of a match confidence of 80% in the speaker identification result.

In some implementations, the speaker identifier 340 may only identify a single user in the speaker identification result. For example, the speaker identifier 340 may determine the user with the match confidence that indicates the highest degree of match and identify that user in the speaker identification result and the match confidence for that speaker. In other implementations, the speaker identifier 340 may identify multiple users in the speaker identification result. For example, the speaker identifier 340 may identify the users with match confidences that satisfy a match confidence threshold, e.g., 50%, 60%, 75%, or some other match confidence, and identify those users in the speaker identification result and their corresponding match confidences. In another example, the speaker identifier 340 may identify the users with match confidences indicating the two, three, or some other number, highest degrees of match and identify those users in the speaker identification result and their corresponding match confidences. The speaker identifier 340 may provide the speaker identification result to the input data value determinator 350.

In some implementations, a local device, such as a device in a user's home or workplace, may perform speaker verification instead of, or in addition to, the speaker identifier 340. For example, the local device may store information derived from speech samples the user provided at enrollment, allowing the local device to determine whether a speaker's voice matches characteristics observed during enrollment. The local device may provide, to the server 300, a speaker verification confidence score and/or a classification result of whether the speaker is likely an authorized user. In addition to speaker verification information, the local device may provide a variety of other contextual information. Generally, the local device may provide as much contextual information as is available and provide it automatically with the voice command. The server 300 then determines which information is needed, and which format is appropriate, to pass to service providers in voice action requests.

The input data value determinator 350 may determine values for input data types used by service providers based on the identified user. For example, the input data value determinator 350 may determine a binary value indicating whether a mobile computing device of a user identified as speaking a voice command is within the user's home. The input data types may include one or more of whether a mobile computing device of a user is in a trusted area based on a GPS sensor in the device 230, whether a mobile computing device of a user is in wireless communication with a trusted device, whether the device 230 has been worn on a person's body since the device 230 was last unlocked, whether the user in a current view of the device 230 matches a stored face for the user, or some other input value data types. A trusted area may be an area in which the user has designated that the user would like to provide voice commands. A trusted device may be a device that the user has designated that the user would like to provide commands when the mobile computing device of the user is in communication with the trusted device.

Similar to the manner described above for the voice action server 220, the input data value determinator 350 may identify a device identifier stored for the mobile computing device used by the identified user, request information from the identified mobile computing device, receive the requested information from the identified mobile computing device, and then generate values for the input data types based on the information. As described above, the input data value determinator 350 may alternatively identify a device identifier stored for the mobile computing device used by the identified user, request information from other devices regarding the identified mobile computing device, receive the requested information from the other devices, and then generate values for the input data types based on the information.

The input data value determinator 350 may provide the determined data types to the provider interface 360. For example, the input data value determinator 350 may provide the provider interface 360 an indication that a user's mobile computing device is not in a trusted area and that the user's mobile computing device has been on a person's body since it was last unlocked.

The provider interface 360 may receive an indication of a selected service provider and a selected voice action from the provider selection engine 330, and may receive values of input data types from the input data value determinator 350 and, in response, provide a request to perform the selected voice action to the selected service provider and one or more values of the input data types. For example, the provider interface 360 may receive an indication of a selected service provider for heating, ventilating, and air conditioning (HVAC) control and an indication of a selected voice action of changing temperature, as well as values for input data types that indicate that (i) that there's a 80% voice match confidence that the user is "John Doe" and (ii) that the mobile computing device of "John Doe" is within a particular geographic area and (iii) that the mobile computing was on a person's body since it was last unlocked. With this information, the provider interface 360 provides the selected service provider an indication of a selected voice action of changing temperature, and provides values that indicate that (i) that there's a 80% voice match confidence that the user is "John Doe" and (ii) that the mobile computing device of "John Doe" is within a particular geographic area. The provider interface 360 may omit providing a value that indicates that the mobile computing device was on a person's body since it was last unlocked as the selected service provider may not use that input data type.

The provider interface 360 may provide one or more values that correspond to the identified one or more input data types based on determining a subset of the input data types that the selected service provider uses to perform authentication for a selected voice action. For example, the provider interface 360 may provide values indicating voice match confidence and whether a mobile computing device of that matched user is in a particular geographic area based on determining that for the selected voice action of changing temperature the selected service provider for HVAC control uses those input data types for authentication. Different contextual information may be provided, depending on which provider is selected to handle the voice action request. In another example, if the HVAC control system uses status information about a mobile computing device, the provider interface 360 may additionally provide a value indicating whether the mobile computing device was on a person's body since it was last unlocked. In yet another example, the provider interface 360 may provide values of input data types of voice match confidence and whether a face in a current view of a camera of the mobile computing device matches the voice matched user based on determining that for the selected voice action of changing temperature another, different selected service provider for HVAC control uses those input data types for authentication.

The provider interface 360 may receiver a response back from a service provider indicating whether the voice action was performed or whether additional information for authentication is needed. For example, the provider interface 360 may receive an indication from a selected service provider for HVAC control that the voice action for changing temperature was completed. In another example, the provider interface 360 may receive an indication from a selected service provider for HVAC control that the voice action for changing temperature was not completed and that a specific additional type of authentication information is needed. The provider interface 360 may provide the indication to the conversation manager 310 and the conversation manager 310 may provide the indication to the user, as discussed above.

Different configurations of the server 300 may be used where functionality of the conversation manager 310, the automated speech recognizer 320, the provider selection engine 330, the voice action database 332, the speaker identifier 340, the speaker voiceprint database 342, the input data value determinator 350, and the provider interface 360 may be combined, further separated, distributed, or interchanged. For example, the provider interface 360 may perform the functions of the input data value determinator 350 to determine just the values for the input data types used by a selected service provider for authentication for a selected voice action. The system 200 may be implemented in a single device or distributed across multiple devices.

Figure 4:
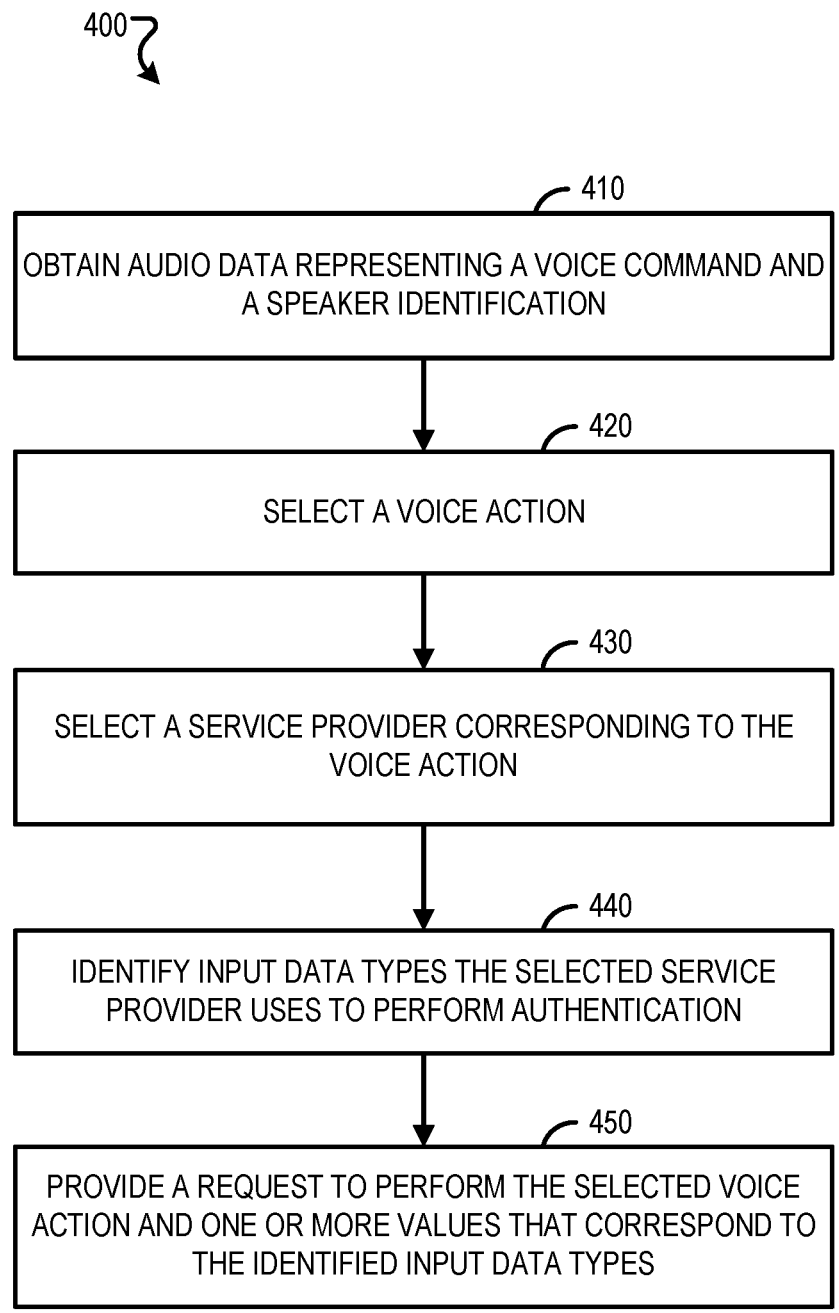
FIG. 4 is a flow diagram that illustrates an example of a process for securely executing voice actions.

FIG. 4 is a flow diagram that illustrates an example of a process for securely executing voice actions. The operations of the process 400 may be performed by one or more computing systems, such as the server 300 of FIG. 3.

Audio data representing a voice command and a speaker identification is received (410). For example, the conversation manager 310 may receive audio data representing "Jane Doe" saying "Disarm security system." Receiving the audio data and a speaker identification may include obtaining audio data representing a voice command spoken by a speaker, obtaining a voiceprint for the speaker, determining that the voiceprint for the speaker matches the audio data representing the voice command spoken by the speaker, and, in response to determining that the voiceprint for the speaker matches the audio data representing the voice command spoken by the speaker, generating the speaker identification result indicating that the voice command was spoken by the speaker.

A voice action may be selected (420). For example, the automated speech recognizer 320 may generate the transcription "Disarm security system" and provide that transcription to the provider selection engine 330 which may determine that those terms match up with a voice action of disarming a security system that is associated with the terms "Disarm security system." Selecting the voice action may include obtaining a set of voice actions, where each voice action identifies one or more terms that correspond to that voice action, determining that one or more terms in the transcription match the one or more terms that correspond to the voice action, and, in response to determining that the one or more terms in the transcription match the one or more terms that correspond to the voice action, selecting the voice action from among the set of voice actions.

A service provider corresponding to the voice action may be selected (430). For example, the provider selection engine 330 may determine that a service provider for a home security system can perform the voice action of disarming a security system and, in response, select the service provider for a home security system. Selecting the service provider corresponding to the voice action may include obtaining a mapping of voice actions to the plurality of service providers, where for each voice action the mapping describes a service provider that can perform the voice action, determining that the mapping of voice actions indicates that the service provider can perform the selected voice action, and in response to determining that the mapping of voice actions indicates that the service provider can perform the selected voice action, selecting the service provider.

Input data types the selected service provider uses to perform authentication may be identified (44). For example, the provider interface 360 may identify that the selected service provider for a home security system uses the input data types of voice match confidence and whether a user's mobile computing device is connected to the home's Wi-Fi network for authentication of the voice action of disarming a security system. Identifying input data types may include providing, to the selected service provider, a request for an identification of one or more input data types that the selected service provider uses to perform authentication for the selected voice action, receiving, from the selected service provider, a response to the request for the identification, and identifying the one or more input data types that the selected service provider uses to perform authentication for the selected voice action from the response to the request for identification.

A request to perform the selected voice action and one or more values that correspond to the identified input data types may be provided (450). For example, the provider interface 360 may provide the selected service provider for a home security system an indication that the selected voice action is disarming the home security system and values of a 90% voice match to "Jane Doe" and that Jane Doe's mobile computing device is connected to the home's Wi-Fi network.

Figure 5:
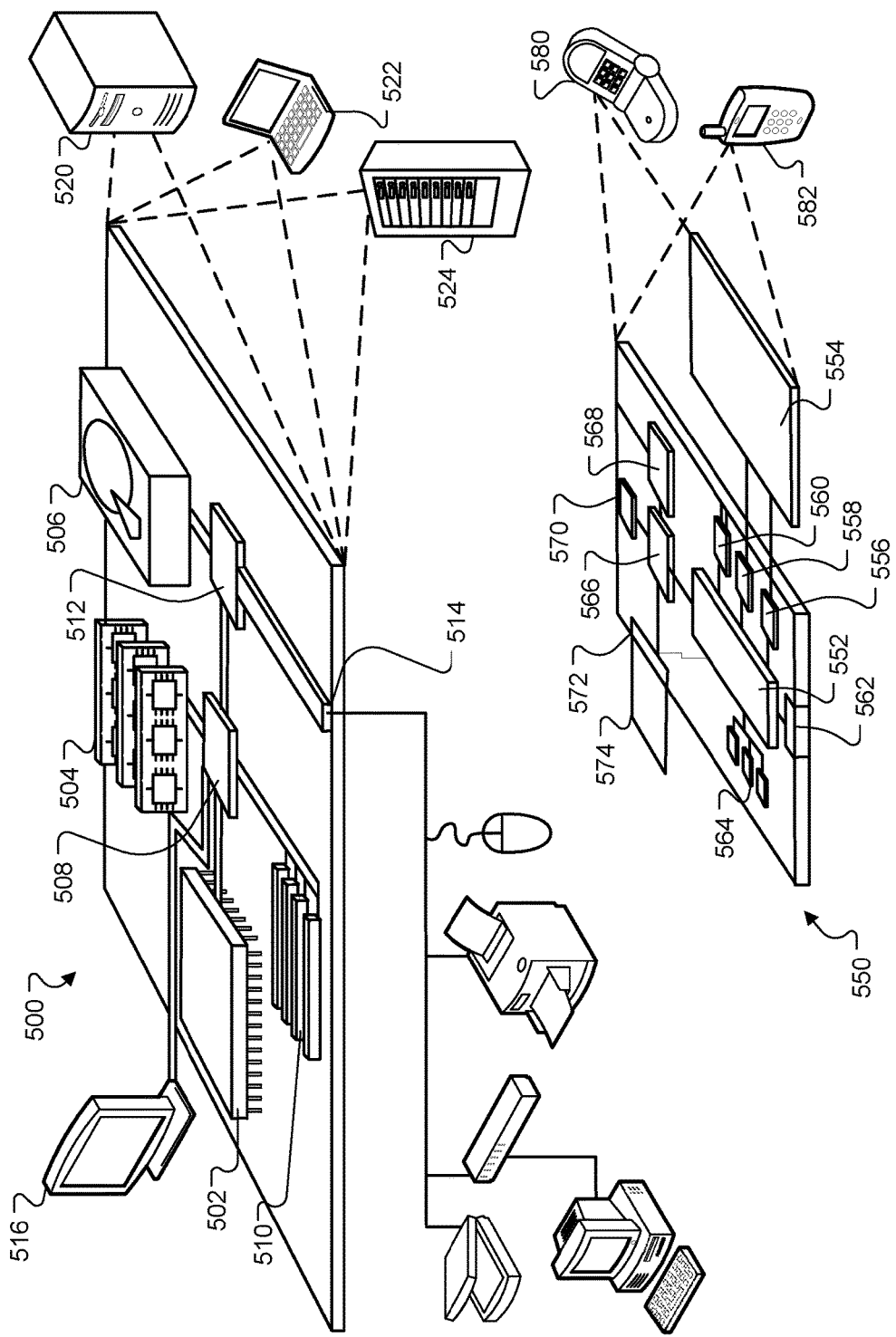
FIG. 5 is a diagram of examples of computing devices.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

What is claimed is:

1. A method performed by a voice action server, the method comprising:
    receiving, by the voice action server, (i) audio data representing a voice command spoken by a speaker and (ii) contextual data from a client device of the speaker, the contextual data indicating a status of the client device and comprising data values representing contextual signals that can authenticate the speaker without requiring the speaker to provide explicit authentication information;
    identifying, by the voice action server, the speaker based on the audio data representing the voice command;
    selecting, by the voice action server, a voice action based at least on a transcription of the audio data;
    selecting, by the voice action server, a third-party service provider from among a plurality of different third-party service providers, wherein the third-party service provider is selected by obtaining a mapping of voice actions to the plurality of third-party service providers, the mapping indicating that the selected third-party service provider can perform the selected voice action, wherein the selected third-party service provider is configured to perform multiple voice actions, and wherein the selected third-party service provider requires different combinations of input data to perform authentication for at least some of the multiple voice actions;
    identifying, by the voice action server, one or more input authentication data types that the selected third-party service provider uses to perform authentication for the selected voice action, wherein the identified one or more input authentication data types for the selected action are different from one or more input authentication data types that the selected third-party service provider uses to perform authentication for at least one other voice action;
    obtaining, by the voice action server without requiring the speaker to provide explicit authentication information, one or more authentication data values representing contextual signals from the received contextual data that correspond to the identified one or more input authentication data types; and
    providing, to the third-party service provider by the voice action server over a network, (i) a request to perform the selected voice action and (ii) a speaker identification result determined based on the audio data representing the voice command, and (iii) the obtained one or more authentication data values from the received contextual data, wherein the speaker identification result and the one or more obtained authentication data values enable the selected third-party service provider to authenticate the speaker and perform the selected voice action.

2. The method of claim 1, wherein identifying, by the voice action server, the speaker from the audio data representing the voice command comprises:
    obtaining the audio data representing the voice command spoken by the speaker;
    obtaining a voiceprint for the speaker;
    determining that the voiceprint for the speaker matches the audio data representing the voice command spoken by the speaker; and
    in response to determining that the voiceprint for the speaker matches the audio data representing the voice command spoken by the speaker, generating the speaker identifier for the speaker that spoke the voice command.

3. The method of claim 1, wherein selecting a voice action based at least on a transcription of the audio data comprises:
    obtaining a set of voice actions, wherein each voice action identifies one or more terms that correspond to that voice action;
    determining that one or more terms in the transcription match the one or more terms that correspond to the voice action; and
    in response to determining that the one or more terms in the transcription match the one or more terms that correspond to the voice action, selecting the voice action from among the set of voice actions.

4. The method of claim 1, wherein selecting a third-party service provider corresponding to the selected voice action from among a plurality of different third-party service providers comprises:
    obtaining a mapping of voice actions to the plurality of third-party service providers, where for each voice action the mapping describes a third-party service provider that can perform the voice action;
    determining that the mapping of voice actions indicates that the third-party service provider can perform the selected voice action; and
    in response to determining that the mapping of voice actions indicates that the third-party service provider can perform the selected voice action, selecting the third-party service provider.

5. The method of claim 1, wherein identifying one or more input data types, in addition to speaker identification, that the selected third-party service provider uses to perform authentication for the selected voice action comprises:
    providing, to the selected third-party service provider over a network, a request for an identification of one or more input data types that the selected third-party service provider uses to perform authentication for the selected voice action;
    receiving, from the selected third-party service provider, a response to the request for the identification; and
    identifying the one or more input authentication data types that the selected service provider uses to perform authentication for the selected voice action from the response to the request for the identification.

6. The method of claim 1, comprising:
generating the transcription of the audio data using an automated speech recognizer.

7. The method of claim 1, comprising:
receiving, from the third-party service provider, an indication that the selected voice action has been performed.

8. The method of claim 1, comprising:
receiving, from the third-party service provider, an indication that additional authentication is needed to perform the selected voice action; and
in response to receiving, from the third-party service provider, the indication that additional authentication is needed to perform the selected voice action, providing a request for additional authentication.

9. The method of claim 1, wherein identifying one or more input authentication data types, in addition to speaker identification, that the selected third-party service provider uses to perform authentication for the selected voice action comprises:
identifying that the selected third-party service provider uses one or more of an input authentication data type that indicates whether the speaker's mobile computing device has been on a body since the mobile computing device was last unlocked, an input authentication data type that indicates whether a speaker's mobile computing device is in short-range communication with a particular device, an input authentication data type that indicates whether a speaker's mobile computing device is within a particular geographic area, or an input authentication data type that indicates whether a speaker's face is in a view of a device.

10. The method of claim 1, wherein one or more input authentication data types includes a data type that indicates a location of the client device and wherein the selected third-party service provider uses the location of the client device to perform authentication for the selected voice action.

11. The method of claim 1, wherein one or more input authentication data types includes a data type that indicates whether the client device has been on a body since the client device was last unlocked.

12. The method of claim 1, wherein one or more input authentication data types includes a data type that indicates whether the client device is in short-range communication with a second device.

13. A system comprising:
one or more computers and one or more storage devices storing instructions that are operable, when executed by the one or more computers, to cause a voice action server to perform operations comprising:
receiving (i) audio data representing a voice command spoken by a speaker and (ii) contextual data from a client device of the speaker, the contextual data indicating a status of the client device and providing data values representing contextual signals that can authenticate the speaker without requiring the speaker to provide explicit authentication information;
identifying, the speaker from the audio data representing the voice command;
selecting a voice action based at least on a transcription of the audio data;
selecting a third-party service provider from among a plurality of different third-party service providers, wherein the third-party service provider is selected by obtaining a mapping of voice actions to the plurality of third-party service providers, the mapping indicating that the selected third-party service provider can perform the selected voice action, the selected third-party service provider is configured to perform multiple voice actions, and wherein the selected third-party service provider requires different combinations of input data to perform authentication for at least some of the multiple voice actions;
identifying one or more input authentication data types that the selected third-party service provider uses to perform authentication for the selected voice action, wherein the identified one or more input authentication data types for the selected action are different from one or more input data types that the selected third-party service provider uses to perform authentication for at least one other voice action;
obtaining, without requiring the speaker to provide explicit authentication information, one or more authentication data values representing contextual signals from the received contextual data that correspond to the identified one or more input authentication data types; and
providing, to the third-party service provider over a network, (i) a request to perform the selected voice action and (ii) a speaker identification result determined based on the audio data representing the voice command, and (iii) the obtained one or more authentication data values from the received contextual data, wherein the speaker identification result and the one or more obtained authentication data values enable the selected third-party service provider to authenticate the speaker and perform the selected voice action.

14. The system of claim 13, wherein identifying the speaker from the audio data representing the voice command comprises:
obtaining the audio data representing the voice command spoken by the speaker;
obtaining a voiceprint for the speaker;
determining that the voiceprint for the speaker matches the audio data representing the voice command spoken by the speaker; and
in response to determining that the voiceprint for the speaker matches the audio data representing the voice command spoken by the speaker, generating the speaker identification result indicating that the voice command was spoken by the speaker.

15. The system of claim 13, wherein selecting a voice action based at least on a transcription of the audio data comprises:
obtaining a set of voice actions, wherein each voice action identifies one or more terms that correspond to that voice action;
determining that one or more terms in the transcription match the one or more terms that correspond to the voice action; and
in response to determining that the one or more terms in the transcription match the one or more terms that correspond to the voice action, selecting the voice action from among the set of voice actions.

16. The system of claim 13, wherein selecting a third-party service provider corresponding to the selected voice action from among a plurality of different third-party service providers comprises:
obtaining a mapping of voice actions to the plurality of third-party service providers, where for each voice action the mapping describes a third-party service provider that can perform the voice action;

determining that the mapping of voice actions indicates that the third-party service provider can perform the selected voice action; and in response to determining that the mapping of voice actions indicates that the third-party service provider can perform the selected voice action, selecting the third-party service provider.

17. The system of claim 13, wherein identifying one or more input authentication data types, in addition to speaker information, that the selected third-party service provider uses to perform authentication for the selected voice action comprises:

providing, to the selected third-party service provider over a network, a request for an identification of one or more input authentication data types that the selected service provider uses to perform authentication for the selected voice action;

receiving, from the selected third-party service provider, a response to the request for the identification; and identifying the one or more input authentication data types that the selected third-party service provider uses to perform authentication for the selected voice action from the response to the request for the identification.

18. The system of claim 13, the operations comprising:
generating the transcription of the audio data using an automated speech recognizer.

19. The system of claim 13, the operations comprising:
receiving, from the third-party service provider, an indication that the selected voice action has been performed.

20. The system of claim 13, the operations comprising:
receiving, from the third-party service provider, an indication that additional authentication is needed to perform the selected voice action; and in response to receiving, from the third-party service provider, the indication that additional authentication is needed to perform the selected voice action, providing a request for additional authentication.

21. The system of claim 13, wherein identifying one or more input authentication data types, in addition to speaker identification, that the selected third-party service provider uses to perform authentication for the selected voice action comprises:

identifying that the selected third-party service provider uses one or more of an input authentication data type that indicates whether the speaker's mobile computing device has been on a body since the mobile computing device was last unlocked, an input authentication data type that indicates whether a speaker's mobile computing device is in short-range communication with a particular device, an input authentication data type that indicates whether a speaker's mobile computing device is within a particular geographic area, or an input authentication data type that indicates whether a speaker's face is in a view of a device.

22. A non-transitory computer-readable storage medium storing a computer program, the program comprising instructions that when executed by one or more computers cause the one or more computers to perform operations comprising:

receiving (i) audio data representing a voice command spoken by a speaker and (ii) contextual data from a client device of the speaker, the contextual data indicating a status of the client device and providing data values representing contextual signals that can authenticate the speaker without requiring the speaker to provide explicit authentication information;

identifying the speaker from the audio data representing the voice command;

selecting a voice action based at least on a transcription of the audio data;

selecting a third-party service provider from among a plurality of different third-party service providers, wherein the third-party service provider is selected by obtaining a mapping of voice actions to the plurality of third-party service providers, the mapping indicating that the selected third-party service provider can perform the selected voice action, the selected third-party service provider is configured to perform multiple voice actions, and wherein the selected third-party service provider requires different combinations of input data to perform authentication for at least some of the multiple voice actions;

identifying one or more input authentication data types that the selected third-party service provider uses to perform authentication for the selected voice action, wherein the identified one or more input authentication data types for the selected action are different from one or more input authentication data types that the selected third-party service provider uses to perform authentication for at least one other voice actions;

obtaining, without requiring the speaker to provide explicit authentication information, one or more data values from the received contextual data that correspond to the identified one or more input authentication data types; and providing, to the third-party service provider over a network, (i) a request to perform the selected voice action and (ii) a speaker identification result determined based on the audio data representing the voice command, and (iii) the obtained one or more authentication data values from the received contextual data, wherein the speaker identification result and the one or more obtained authentication data values enable the selected third-party service provider to authenticate the speaker and perform the selected voice action.

23. The non-transitory computer-readable storage medium of claim 22, wherein identifying the speaker from the audio data representing the voice command comprises:

obtaining the audio data representing the voice command spoken by the speaker;

obtaining a voiceprint for the speaker;

determining that the voiceprint for the speaker matches the audio data representing the voice command spoken by the speaker; and in response to determining that the voiceprint for the speaker matches the audio data representing the voice command spoken by the speaker, generating the speaker identification result indicating that the voice command was spoken by the speaker.

* * * * *